United States Patent Office 3,836,492
Patented Sept. 17, 1974

3,836,492
POLYMERIZABLE UNSATURATED REACTION PRODUCT OF A DIISOCYANATE AND AN UNSATURATED PRODUCT OF A DICARBOXYLIC ACID ANHYDRIDE AND AN UNSATURATED MONOGLYCIDYL MONOMER
Tadashi Watanabe, Kouichiro Murata, and Kenjiro Tsubouchi, Hiratsuka, Japan, assignors to Kansai Paint Co., Ltd., Amagasaki-shi, Japan
No Drawing. Continuation-in-part of application Ser. No. 255,650, May 22, 1972, which is a continuation-in-part of application Ser. No. 210,155, Dec. 20, 1971, both now abandoned. This application Dec. 14, 1973, Ser. No. 424,747
Claims priority, application Japan, Dec. 24, 1970, 45/117,266
Int. Cl. C08g 22/04
U.S. Cl. 260—23 TN                     12 Claims

ABSTRACT OF THE DISCLOSURE

Polymerizable unsaturated and urethanated compounds useful for coating compositions whereby said polymerizable unsaturated and urethanated compounds are obtained by reacting diisocyanate compounds with reaction products which are obtained by reacting dicarboxylic compounds with polymerizable unsaturated monoglycidyl monomers. The hardened materials obtained from said polymerizable unsaturated and urethanated compounds are excellent in their chemical and mechanical properties.

---

This is a continuation-in-part of application Ser. No. 255,650, filed May 22, 1972, which was a continuation-in-part of application Ser. No. 210,155, filed Dec. 20, 1971, now both abandoned.

This invention relates to cross-linkable synthetic resins useful for coating compositions which have excellent mechanical and chemical properties. Particularly, this invention relates to polymerizable unsaturated and urethanated compounds whereby said polymerizable unsaturated and urethanated compounds are obtained by reacting diisocyanate compounds with the reaction products (hereinafter referred to as "glycidyl compounds") which are obtained by reacting dicarboxylic compounds with polymerizable unsaturated monoglycidyl monomers.

The polymerizable unsaturated and urethanated compounds of this invention are linear polymers having polymerizable unsaturated groups and the urethane linkages. The polymerizable unsaturated and urethanated compounds of the present invention which are derived from the reaction of the diisocyanate compounds with the glycidyl compounds obtained from the dicarboxylic compounds and the monoglycidyl monomers, are novel. Further, the polymerizable unsaturated and urethanated compounds obtained in accordance with the present invention have improved bending properties and adherence as compared with ordinary cross-linkable synthetic resins. In addition, the products obtained in accordance with the present invention have several superior properties such as good chemical resistance, corrosion resistance, gloss and curing property.

In the following, the method to prepare the polymerizable unsaturated and urethanated compound of the present invention will be explained in detail.

In short, the polymerizable unsaturated and urethanated compound of the present invention can be prepared by reacting the diisocyanate compounds with the glycidyl compounds.

The aforementioned reaction between the dicarboxylic compounds and the unsaturated monoglycidyl monomers having polymerizable unsaturated groups and glycidyl groups, can be carried out according to the well known art. The dicarboxylic compounds used for said reaction are phthalic acid or its anhydride, isophthalic acid, terephthalic acid, tetrahydrophthalic acid or its anhydride, hexahydrophthalic acid or its anhydride, endo-bicyclo [2,2,1]-5-heptene-2,3-dicarboxylic acid and its anhydride, succinic acid or its anhydride, adipic acid, sebacic acid, 1,4,5,6,7,7-hexachloro-bicyclo-[2,2,1]-5-heptene - 2,3 - dicarboxylic acid and its anhydride, maleic acid or its anhydride and fumaric acid. And as for the unsaturated monoglycidyl monomers, glycidyl methacrylate, glycidyl acrylate, butadiene monoxide, vinylcyclohexane monoxide and allyl glycidyl ether are typical.

The reaction between the dicarboxylic compounds and the unsaturated glycidyl monomers is a ring-opening esterification between the epoxy groups in the unsaturated monoglycidyl monomers and the carboxyl groups in the dicarboxylic compounds, which can be carried out in accordance with the well known art. In this esterification reaction, 1 mol of carboxyl groups is reacted with 0.90 to 1.10 mols of epoxy groups in the unsaturated monoglycidyl monomers at a temperature of 50°–150° C. and the reaction is to be continued until 95% or more of the epoxy groups of the unsaturated monoglycidyl monomers react with the carboxyl groups in the dicarboxylic compounds.

If the amount of epoxy groups is less than 0.90 mol per 1 mol of the carboxyl groups, the unreacted acid component remains in the reaction system and causes gelation in the subsequent urethanation reaction. On the other hand, if the amount of epoxy groups is more than 1.10 mols per 1 mol of the carboxyl groups, gelation by the unreacted epoxy groups is liable to occur on urethanation reaction.

In the above reaction to obtain the esterified compound, if compounds having two epoxy groups are employed instead of the unsaturated monoglycidyl monomers, the reaction products thus obtained have three or more hydroxyl groups since the diepoxy-compounds react with the dicarboxylic acids to form a linear prepolymer. Accordingly, the reaction product is liable to form a three dimensional structure in the following urethanation reaction which causes gelation.

The reaction between the dicarboxylic compounds and the unsaturated monoglycidyl monomers can proceed without the addition of a third component. However, it is desirable that the reaction be carried out in the presence of polymerizable vinyl monomers. When the polymerizable vinyl monomers are introduced in the reaction systems, there is the advantage that one can easily react the dicarboxylic compounds with the unsaturated monoglycidyl compounds, and one can easily raise the conversion ratio of the dicarboxylic compounds to the unsaturated monoglycidyl compounds, since the polymerizable vinyl monomers dissolve the acid monomers. The polymerizable vinyl monomers are used in the amount which comes to 15%–45% by weight of a mixture of the polymerizable vinyl monomers and the glycidyl compounds. In this case, styrene, vinyl toluene, chlorostyrene, divinyl benzene, diallyl phthalate, acrylic esters having an alkyl group of 1 to 12 carbon atoms, methacrylic esters having an alkyl group of 1 to 12 carbon atoms, acrylonitrile and vinyl propionate are used as said vinyl monomers, and they may be used alone or in a mixture. Further, it is desirable that all or nearly all of the carboxyl groups in the dicarboxylic compounds react with the glycidyl group of the unsaturated monoglycidyl monomers.

As the esterification reaction of phthalic acid as an example of the dicarboxylic acids with glycidyl methacrylate as an example of the unsaturated monoglycidyl monomers to obtain the glycidyl compounds, the following is typical:

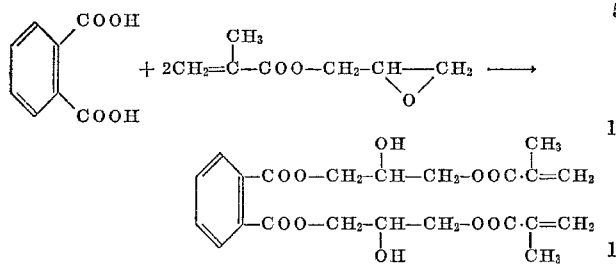

It will be understood that the reaction products of the above glycidyl compounds have polymerizable unsaturated groups and free hydroxyl groups in the molecule.

The polymerizable unsaturated and urethanated compounds of the present invention can be obtained by the reaction of diisocyanates and the thus obtained glycidyl compounds.

The diisocyanate compounds which can be used for obtaining the polymerizable unsaturated and urethanated compounds in the present invention are, for example, 2,4-tolylene diisocyanate, 2,6-tolylene diisocyanate, 1,6-hexamethylene diisocyanate, 4,4' - diphenylmethane diisocyanate, 4,4'-diphenylether diisocyanate, m-phenylene diisocyanate, dicyclohexylmethane - 4,4'-diisocyanate, p-xylylene diisocyanate, m-xylylene diisocyanate and bis(4-isocyanatophenyl)sulfone, and the reaction product of the above diisocyanate compounds and dihydric alcohols. As for said dihydric alcohols, one or a mixture of ethylene glycol, propylene glycol, butanediol, diethylene glycol, 2,2 - di(4 - hydroxyphenyl) propane, hydrogenated bisphenol A, neopentyl glycol, 1,5-pentanediol, triethylene glycol, dipropylene glycol and 1,6-hexanediol can be used. In the reaction of these dihydric alcohols and diisocyanate compounds, 1 mol of dihydric alcohol is caused to react with more than 2.0 mols of diisocyanate compound such that two hydroxyl groups in the dihydric alcohols react with one isocyanate group in said diisocyanate compounds. Therefore, the thus obtained reaction product has still two isocyanate groups in each combined molecule, or is a mixture of the disocyanate compounds and said obtained reaction product. However, it is desirable in this reaction of the present invention for 1 mol of dihydric alcohol to be reacted with 2.0 mols of the diisocyanate compounds. The above reaction can be carried out in accordance with the known method. The diisocyanate compounds referred to in the present invention include both the above mentioned diisocyanates and the reaction products of said diisocyanate compounds and dihydric alcohols.

The following is typical of the urethanation reaction of a glycidyl compound with the reaction product of 2 mols of 2,4-tolylene diisocyanate and 1 mol of ethylene glycol used as the diisocyanate component:

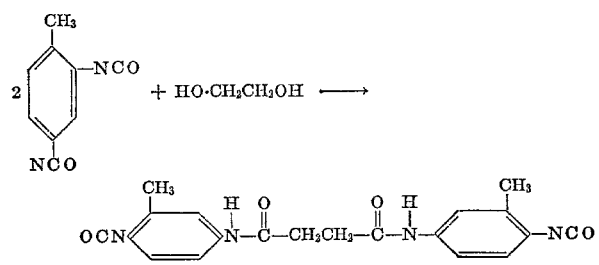

and

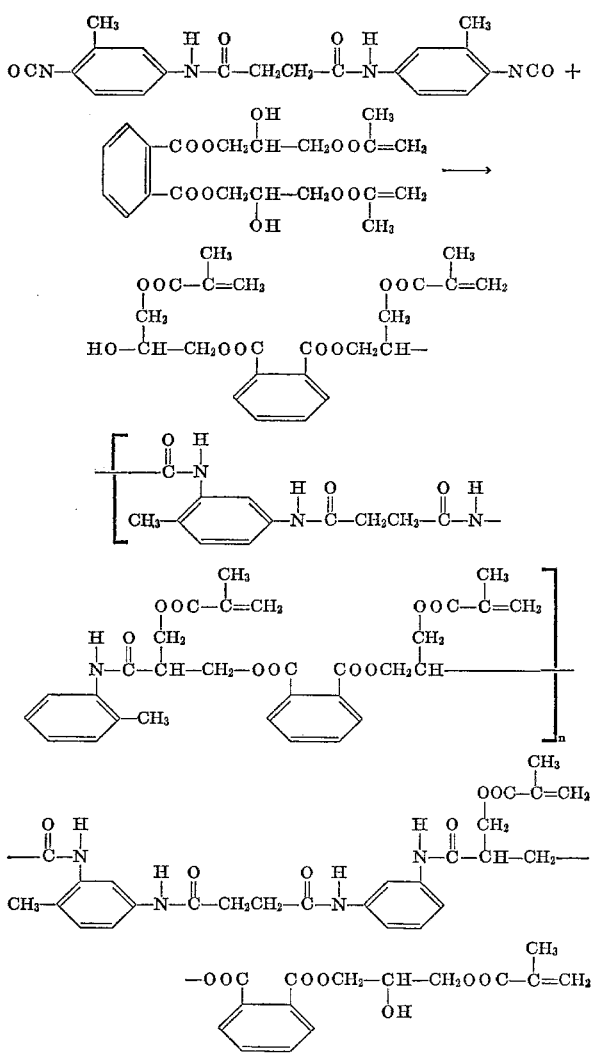

(in which $n$ represents a numerical value of 0 to 5).

In the present invention, the reaction between the diisocyanate compounds and the glycidyl compounds is a novel one. That is, in this reaction, the free hydroxyl groups in the glycidyl compounds react with the isocyanate groups in the diisocyanate compounds, and the polymerizable unsaturated groups in the glycidyl compounds do not take part in this reaction (polymerizable unsaturated compounds having high molecular weight are obtained, in which a molecular weight per one polymerizable unsaturated group is almost not changed), which is the characteristic feature of the present invention. In practice, the polymerizable unsaturated and urethanated compounds of the invention can be obtained by adding the diisocyanate compounds into the glycidyl compounds, and heating for a certain period of time with agitation. In this case, the reaction temperature and the reaction time can be determined in compliance with the degree of the urethanation as desired. The reaction temperature is generally in the range of 40°–120° C., and preferably in the range of 50°–80° C., however, the reaction can also proceed at room temperature. Therefore, the temperature of the reaction is not restricted especially in the invention. The reaction period depends upon the reaction temperature and the degree of urethanation, however, the period from 20 minutes to 5 hours is acceptable for the practical process, but it is not intended to restrict the reaction period by such values. When the reaction proceeds in a relatively low temperature range, it is preferable that the urethanation reaction is carried out after controlling the viscosity of the reaction mixture by adding vinyl monomers which are not reactive with isocyanate groups and hydroxyl groups, because the reaction mixture is viscous and as the reaction proceeds, the viscosity of the mixture increases, becoming the cause of the uneven reaction. Accordingly, as vinyl monomers which can be used in this invention, styrene, vinyl toluene, chlorostyrene, divinylbenzene, diallyl phthalate, acrylic esters having an alkyl group of 1 to 12 carbon atoms, methacrylic esters having an alkyl group of 1 to 12 carbon atoms, acrylonitrile and vinyl propionate are typical. When the vinyl monomers are used for a high temperature (higher than about 100° C.) and long period reaction (longer than about 3 hours), polymerization inhibitors may be used to prevent the occurrence of gelation caused by the reaction between the vinyl monomers and the polymerizable unsaturation in the glycidyl compounds. Said polymerization inhibitors may be, for example, hydroquinone, mono-tert-butyl hydroquinone, catechol, p-tert-butyl catechol, 2,5-di-tert-butyl hydroquinone, benzoquinone, 2,5-diphenyl-p-benzoquinone, di-p-fluorophenyl amine and 2,6-di-tert-butylhydroxy toluene.

The urethanation reaction of the present invention proceeds even at room temperature. Therefore, a reaction terminating agent must be used after the reaction in order to stabilize the polymerizable unsaturated and urethanated compounds obtained. As for terminating agents, for example, methanol, ethanol, propanol and butanol can be used, and furthermore, β-hydroxyethyl acrylate, β-hydroxyethyl methacrylate, β-hydroxypropyl acrylate, β-hydroxypropyl methacrylate, allyl alcohol and methallyl alcohol are preferable for the present invention. Especially, the alcohols having polymerizable unsaturated groups are suitable as reaction terminating agents, because, since the terminating agents are cross-linkable, the cross-linked synthetic resin exhibits the excellent properties.

The amount of the diisocyanate compounds to be used is from 0.5 to 1.0 mol per 1 mol of the free hydroxyl group in the glycidyl compounds.

If the amount of the diisocyanate compounds is smaller than the above range, the polymerization reaction cannot be fully completed, and it is difficult to attain the object of the present invention. On the other hand, if the amount of diisocyanate is larger than the above range, it becomes excessive with respect to the amount of the hydroxyl groups in the glycidyl compounds, which causes gelation during the reaction.

As described in the above, the polymerizable unsaturated and urethanated compounds of the present invention can be highly polymerized as compared with the ordinary known cross-linkable synthetic resins. Therefore, the polymerizable unsaturated groups in the reaction product are fully reacted. That is, the polymerizable unsaturated and urethanated compounds of the present invention are obtained by the reaction of the diisocyanate compounds with the glycidyl compounds, in which the reaction is caused by the addition reaction of the free hydroxyl groups in the glycidyl compounds with the isocyanate groups in the diisocyanate compounds. The glycidyl compounds are used alone or in a mixture. The degree of the urethanation can be controlled by the amount of the diisocyanate compound used and other reaction conditions. Accordingly, as compared with the ordinary cross-linkable resins, it is possible to obtain a very large molecular weight product without any trouble such as gelation and so forth, and polymerizable unsaturated groups are introduced uniformly in the molecules. Further, in the urethanation reaction in the present invention, the polymerizable unsaturated groups of the glycidyl compounds do not participate in the reaction, because the reaction takes place between the hydroxyl groups in the glycidyl compounds and the isocyanate groups in the diisocyanate compounds used.

That is, the polymerizable unsaturated groups are not lost after the urethanation reaction. In other words, a plurality of polymerizable unsaturated groups can be introduced into the molecules. Accordingly, the hardening property of the product is not decreased even when it is highly polymerized, which is one of the advantages as compared with that of ordinary resins.

Furthermore, ordinary cross-linkable resins are inferior in adhesiveness to metals and plastics, as well as in water resistance, and therefore, in the practical uses requiring these properties, these properties cannot be achieved satisfactorily.

The polymerizable unsaturated and urethanated compounds of the present invention have urethane bonds and are large in the molecular weight, so that adhesiveness to metals and plastics as well as to wood is excellent. Further, it is also superior in water resistance. Therefore, it is also the characteristic feature of the present invention that the polymerizable unsaturated and urethanated compounds of the invention has broader uses compared with the ordinary cross-linkable resins.

Still further, the polymerizable unsaturated urethanated compounds of the present invention are very much improved in their chemical resistance, solvent resistance and have lesser crack formation when being used as a coating material, as they are high in molecular weight, and are introduced with the urethane groups and the polymerizable unsaturated groups in the molecule.

As is well known, the unsaturated polyester resin which has been used in large quantities as one of the cross-linkable synthetic resins has several defects such as inferior surface curing property. The polymerizable unsaturated and urethanated compounds of the present invention are very much improved also in the surface curing property as they have urethane groups in the molecule.

The polymerizable unsaturated and urethanated compounds of the present invention can be used alone, or in a mixture with the ordinary cross-linkable monomers. The curing or hardening of them can be carried out by the ordinary known methods. For example, as the curing methods, there are normal temperature treatment, heating, irradiation of actinic rays and irradiation of ionizing radiation. In case the curing is carried out at a normal temperature or by heating, conventional polymerization promotors are preferably used. When the curing is carried out by the irradiation of actinic rays, it is necessary to use conventional photosensitizers.

The polymerizable unsaturated and urethanated compounds obtained in accordance with the invention can be utilized for molded articles, laminates, adhesives, coating materials, etc.

In the following, the objects and features of the present invention will be further clarified by way of several examples which are intended as merely illustrative and in no way restrictive of the invention.

EXAMPLE 1

A mixture consisting of 1 mol of maleic acid anhydride, 43 g. of butyl acrylate as a solvent, 0.5 weight percent (vs. maleic anhydride) of triethylamine as a catalyst, and 500 p.p.m. (vs. maleic anhydride) of p-tert-butyl-hydroxy toluene as a polymerization inhibitor, was prepared, and the mixture was heated to 100° C. Reaction was caused with 2 mols of glycidyl methacrylate which was dropped into said mixture for 4 hours, followed by 1 mol of water. After the dropping, the reaction was continued further for 1 hour at the same temperature. Then the temperature of this reaction mixture was raised gradually to 110° C. for 1 hour, and the reaction further proceeded for 3 hours at that temperature. Thereby, a glycidyl compound having an acid value of less than 5 was obtained. This glycidyl compound was mixed with 52 g. of styrene to form about an 80% solution. The temperature of this solution was then controlled at 70° C., and 80 weight percent solution of 0.5 mol hexamethylene diisocyanate in butyl acrylate was dropped therein for 3 hours, and thereafter this reaction further proceeded for 4 hours at the same temperature to obtain a polymerizable unsaturated and urethanated compound. The isocyanate value of the reaction mixture after the reaction was less than 1.

EXAMPLE 2

A mixture consisting of 1 mol (100 g.) of succinic acid anhydride, 96 g. of butyl acrylate as a solvent, 1 g. of p-tert-butyl hydroxy toluene as a polymerization inhibitor and 0.5 weight percent (vs. succinic anhydride) triethylamine was heated at 110° C. Reaction was caused by dropping 2 mols glycidyl methacrylate into said mixture for 2 hours. After the dropping, 1 mol of water was added into the reaction mixture. The temperature of the reaction mixture was raised to 115° C., and the reaction was continued for 2 hours at the same temperature. A reaction mixture if final acid value of 15 and 80% butyl acrylate solution was obtained.

After the reaction mixture cooled to 70° C., 378 g. butyl acrylate solution containing 0.8 mol xylene diisocyanate was dropped into the reaction mixture for 2 hours, then heated at 80° C. and then reaction further proceeded for 3 hours. After the reaction, the isocyanate value was 2.

EXAMPLE 3

A mixture consisting of 1 mol (146 g.) of adipic acid, 107 g. of lauryl methacrylate as a solvent, 1.5 g. of tetraethylammonium bromide as a catalyst and 0.32 g. of hydroquinone as a polymerization inhibitor was charged into the reactor and heated at 120° C. Into the reactor containing the heated mixture, 2.2 moles (282 g.) of glycidyl acrylate were dropwise charged in the course of 3 hours. The reaction was continued further for 5 hours at the same temperature. The acid value of the reaction product was below 2. Then the temperature of this reaction mixture was lowered gradually to 70° C., and a mixture consisting of 0.95 mol (165 g.) of tolylene diisocyanate (a mixture of 2,4- and 2,6-types) and 41 g. of n-butyl methacrylate was added dropwise to the reaction mixture in the course of 2 hours and the reaction further proceeded for 4 hours at that temperature. Thereby, a reaction product having an isocyanate value of 1 was obtained. By these reaction procedures, a vinyl monomer solution (resin content of 80% by weight) of a polymerizable unsaturated and urethanated compound was obtained.

EXAMPLE 4

A mixture consisting of 1 mol (202 g.) of sebacic acid, 115 g. of 2-ethylhexyl acrylate as a solvent, 4 g. of dimethyl coconut amine as a catalyst and 0.57 g. tert-butyl catechol as a polymerization inhibitor was charged into the reactor and heated at 120° C. 1.8 moles (256 g.) of glycidyl methacrylate were added dropwise in the course of 1.5 hours into the reaction mixture, then the reaction was further proceeded for 5 hours at 120° C. The reaction product thus obtained had the acid value of below 3. Then, reaction temperature was lowered gradually to 80° C., a mixture consisting of 88 g. of ethyl acrylate and 0.75 mol (350 g.) of reaction product of 1 mol of 1,6-hexanediol with 2 moles of tolylene diisocyanate (a mixture of 2,4- and 2,6-type) was added dropwise in the course of 3 hours into the reaction mixture, the reaction was further proceeded for 4 hours at that temperature. Thereby, a reaction product having an isocyanate value of 1.5 was obtained. By these reaction procedures, a vinyl monomer solution (resin content of 80% by weight) of a polymerizable unsaturated and urethanated compound was obtained.

EXAMPLE 5

A mixture consisting of 1 mol (148 g.) of phthalic anhydride, 44 g. of n-butyl methacrylate as a solvent, 1.5 g. of tetraethylammonium bromide as a catalyst and 0.84 g. of p-tert-butyl catechol was charged into the reactor and heated at 140° C. 2 moles (228 g.) of allyl glycidyl ether were added dropwise in the course of 1 hour into the reaction mixture. The reaction was further proceeded for 4 hours at that temperature. An acid value of the reaction product thus obtained was 1.5. Then the temperature of the reaction mixture was lowered gradually to 80° C., a mixture consisting of 56 g. of styrene and 0.8 mol (224 g.) of reaction product of 1 mol of diethylene glycol with 2 moles of tolylene diisocyanate (a mixture of 2,4- and 2,6-type) was added dropwise into the reaction mixture in the course of 4 hours, and the reaction was further proceeded for 5 hours at 80° C. The isocyanate value of the reaction product thus obtained was below 1. By these procedures, vinyl monomer solution (resin content of 80% by weight) of a polymerizable unsaturated and urethanated compound was obtained.

PROPERTIES OF THE POLYMERIZABLE UNSATURATED AND URETHANATED COMPOUND IN EACH EXAMPLE

| Example number | Curing method | Solvent[1] | Percent gel fraction | Pencil hardness | Crosscut adhesion | Ericksen (mm.) | Chemical resistanct 5% $H_2SO_4$ | 5% NaOH | Salt spray |
|---|---|---|---|---|---|---|---|---|---|
| 1 | EB 2 Mrads. (in $N_2$) | ST | 94 | 4H | 90 | 3.0 | ◎ | ◎ | ◎ |
|   | EB 4 Mrads. (in air) | ST | 93 | 4H | 70 | 3.0 | ◎ | ◎ | ○ |
|   | UV 3 min. (in air) | ST | 93 | 4H | 90 | 3.0 | ◎ | ◎ | ◎ |
| Intermediate product in Example 1 | UV 3 min. (in air) | ST | 92 | 4H | 50 | 1.0 | ○ | × | × |
| 2 | EB 2 Mrads. (in $N_2$) | BA | 96 | 4H | 100 | 7.0 | ◎ | ◎ | ◎ |
|   | EB 4 Mrads. (in air) | BA | 94 | 3H | 100 | 7.0 | ◎ | ○ | ○ |
| Intermediate product in Example 2 | EB 4 Mrads. (in air) | BA | 90 | 2H | 80 | 4.0 | ○ | × | × |
| 3 | EB 2 Mrads. (in $N_2$) | LMA, n-BMA | 93 | 2H | 90 | 7.0 | ◎ | ◎ | ◎ |
|   | EB 4 Mrads. (in air) | LMA, n-BMA | 93 | 2H | 80 | 7.0 | ◎ | ○ | ○ |
| 4 | EB 2 Mrads. (in $N_2$) | 2-EMA, EA | 95 | 2H | 95 | 7.0 | ◎ | ◎ | ◎ |
|   | EB 4 Mrads. (in air) | 2-EMA, EA | 93 | 2H | 95 | 7.0 | ◎ | ◎ | ◎ |
| 5 | EB 2 Mrads. (in $N_2$) | n-BMA, ST | 96 | 4H | 90 | 4.0 | ○ | ◎ | ◎ |
|   | EB 4 Mrads. (in air) | n-BMA, ST | 94 | 3H | 85 | 3.0 | ○ | ◎ | ○ |

[1] BA indicates butyl acrylate, and ST indicates styrene.

NOTE.—In the above table:
(1) Electron beam curing condition:
   Voltage ----- 300 kv.
   Amperage ----- 25 ma.
   Distance from the scan ----- 8 cm.
   Film thickness ----- 20-25μ.
   In each $N_2$ and air.
(2) Ultraviolet curing condition:
   Benzoin ethyl ether as photosensitizer ----- 1 weight percent (vs. varnish).
   Mercury-vapor lamp ----- 2 kw.
   Distance from lamp ----- 15 cm.
   Film thickness ----- 30-35μ.
   Radiation time ----- 3 min.
(3) Measuring method of gel-fraction: The cured film stripped from the panel was weighed (W.,g), then dipped in the excess acetone. The extraction of the acetone soluble part proceeded at 50° C. for 8 hours in a vessel equipped with an ultrasonic generator. The insoluble part of the film was dried at 40° C. for 2 hours in vacuum. After drying, the insoluble part of the film was weighed (S.,g). Gel fraction of the film was determined from the equation:

$$\text{Gel Fraction (percent)} = \frac{W-S}{W} \times 100$$

(4) Pencil hardness: A set of pencils ranging from 6B soft to 6H hard was pushed in turn into the film at a 45° angle to the surface. The hardest pencil which did not break the film is indicated as pencil hardness.
(5) Crosscut adhesion: Number of frames not removed by pressing on and rapidly removing Scotch tape to 100 frames made of crosscut of 1 mm. space.
(6) Chemical resistance:
   (a) Immersion test to 5% $H_2SO_4$ and 5% NaOH. The results were evaluated by observing with the naked eye after immersion at 20° C. for 48 hours.
   (b) Salt spray test: ASTM B117-62. The time of evaluation is the time until corrosion or other failure appeared.
   (c) Symbol:
      ◎ Excellent;
      ○ Good;
      × Poor.

COMPARATIVE EXAMPLE 1

A mixture consisting of 1 mol of maleic acid anhydride, 1 mol of Epicoat #828 (trade name of diepoxycompound, epoxy equivalent: 184–193), 3 mols of butyl acrylate as a solvent, 1.0 weight percent (vs. maleic anhydride) of triethylamine, and 2000 p.p.m. (vs. the total weight of the above) of p-tert-butyl-hydroxy toluene as a polymerization inhibitor, was prepared, and the mixture was heated to 120° C. After about 1 hour, this reaction mixture became highly viscous and the reaction was unable to be continued further.

COMPARATIVE EXAMPLE 2

The same mixture as in Comparative Example 1 was prepared except that the amount of maleic acid anhydride was changed to 0.8 mol. The temperature of the mixture was raised to 120° C. and the reaction further continued for 5 hours to obtain an adduct. The conversion of the maleic acid anhydride was more than 95%. The temperature of this adduct solution was then controlled at 70° C. and a solution of 1 mol of hexamethylene diisocyanate in 1 mol of butyl acrylate was dropped therein in order to obtain a polymerizable unsaturated and urethanated compound. After about 30 minutes, however, the reaction system gelled.

We claim:

1. A polymerizable unsaturated and urethanated compound comprising the reaction product of 0.5 to 1.0 mol of isocyanate groups of an organic diisocyanate with 1.0 mol of hydroxyl groups of a polymerizable unsaturated esterified compound, said polymerizable unsaturated esterified compound obtained by reacting 1.0 mol of carboxyl groups of a dicarboxylic acid or the anhydride thereof with 0.90 to 1.10 mol of glycidyl groups of a polymerizable unsaturated monoglycidyl monomer at 50°–150° C. in the presence of a polymerization inhibitor until at least 95% of the epoxy groups of the unsaturated monoglycidyl monomer react with the carboxyl groups in the dicarboxylic acid or anhydride.

2. A polymerizable unsaturated and urethanated compound according to claim 1 in which said diisocyanate is selected from the group consisting of 2,4-tolylene diisocyanate, 2,6-tolylene diisocyanate, 1,6-hexamethylene diisocyanate, 4,4'-diphenylmethane diisocyanate, 4,4'-diphenylether diisocyanate, m-phenylene diisocyanate, dicyclohexylmethane-4,4'-diisocyanate, p-xylylene diisocyanate, m-xylylene diisocyanate, bis (4-isocyanatophenyl) sulfone and reacted diisocyanates which are the reaction products of more than 2 mols of said diisocyanate and 1 mol of a dihydric alcohol.

3. A polymerizable unsaturated and urethanated compound according to claim 2 in which said dihydric alcohol is selected from the group consisting of ethylene glycol, propylene glycol, butanediol, diethylene glycol, 2,2-di(4-hydroxyphenyl)propane, hydrogenated bisphenol A, neopentyl glycol, 1,5-pentanediol, triethylene glycol, dipropylene glycol and 1,6-hexanediol.

4. A polymerizable unsaturated and urethanated compound according to claim 1 in which said dicarboxylic acid or anhydride is selected from the group consisting of phthalic acid or its anhydride, isophthalic acid terephthalic acid, tetrahydrophthalic acid or its anhydride, hexahydrophthalic acid or its anhydride, bicyclo[2,2,1]-5-hexene-2,3-dicarboxylic acid or its anhydride, succinic acid or its anhydride, adipic acid, sebacic acid, bicyclo[2,2,1]-hexachloro-5-hexene-2,3-dicarboxylic acid or its anhydride, maleic acid or its anhydride, and fumaric acid.

5. A polymerizable unsaturated and urethanated compound according to claim 1 in which said polymerizable unsaturated monoglycidyl monomer is selected from the group consisting of glycidyl methacrylate, glycidyl acrylate, butadiene monoxide, vinylcyclohexane monoxide and allyl glycidyl ether.

6. A polymerizable unsaturated and urethanated compound according to claim 1 in which said polymerizable unsaturated esterified compound is prepared in the presence of 15%–45% by weight of a mixture of a polymerizable vinyl monomer and the polymerizable unsaturated monoglycidyl compound.

7. A polymerizable unsaturated and urethanated compound according to claim 6 in which said polymerizable vinyl monomer is selected from the group consisting of styrene, vinyl toluene, chlorostyrene, divinyl benzene, diallyl phthalate, acrylic esters having an alkyl group of 1 to 12 carbon atoms methacrylic esters having an alkyl group of 1 to 12 carbon atoms acrylonitrile and vinyl propionate.

8. A polymerizable unsaturated and urethanated compound according to claim 1 in which said polymerizable unsaturated monoglycidyl monomer is glycidyl methacrylate, said dicarboxylic acid or anhydride is maleic acid anhydride and said organic diisocyanate is hexamethylene diisocyanate.

9. A polymerizable unsaturated and urethanated compound according to claim 1 in which said unsaturated monoglycidyl monomer is glycidyl methacrylate, said dicarboxylic acid or anhydride is succinic acid anhydride and said organic diisocyanate is xylylene diisocyanate.

10. A polymerizable unsaturated and urethanated compound according to claim 1 in which said unsaturated monoglycidyl monomer is glycidyl acrylate, said dicarboxylic acid or anhydride is adipic acid and said organic diisocyanate is tolylene diisocyanate.

11. A polymerizable unsaturated and unrethanated compound according to claim 1 in which said unsaturated monoglycidyl monomer is glycidyl methacrylate, said dicarboxylic acid or anhydride is sebacic acid and said organic diisocyanate is a reaction product of 1 mol of 1,6-hexanediol with 2 moles of tolylene diisocyanate.

12. A polymerizable unsaturated and urethanated compound according to claim 1 in which said unsaturated monoglycidyl monomer is allyl glycidyl ether, said dicarboxylic acid or anhydride is phthalic anhydride and said organic diisocyanate is a reaction product of 1 mol of diethylene glycol with 2 moles of tolylene diisocyanate.

References Cited

UNITED STATES PATENTS

| | | | |
|---|---|---|---|
| 3,549,583 | 12/1970 | Nagata et al. | 260—859 |
| 3,478,126 | 11/1969 | Turpin et al. | 260—78.4 |
| 3,373,221 | 3/1968 | May | 260—23 |
| 3,563,929 | 2/1971 | Guldenpfennig | 260—23 |
| 3,591,626 | 7/1971 | Aronogg et al. | 260—78.4 |
| 3,634,542 | 1/1972 | Dowd et al. | 260—78.4 |
| 3,459,828 | 8/1969 | Michelotti et al. | 260—78.4 |
| 3,507,821 | 4/1970 | Vasta. | |

OTHER REFERENCES

"Epoxydverbindungen und Epoxydharze" by Paquin; Springer-Verlag, Berlin, p. 256; TP 986. E6 P3; Copy in Group 140.

DONALD E. CZAJA, Primary Examiner

E. C. RZUCIDLO, Assistant Examiner

U.S. Cl. X.R.

260—18 TN, 18 PT, 23 EP, 78.4 EP, 836, 859 R